(12) United States Patent
Erämaa

(10) Patent No.: US 9,885,248 B2
(45) Date of Patent: Feb. 6, 2018

(54) SYSTEM AND METHOD FOR GENERATING ELECTRIC ENERGY

(71) Applicant: FINNO ENERGY OY, Lahti (FI)

(72) Inventor: Timo Erämaa, Helsinki (FI)

(73) Assignee: Finno Energy Oy, Lahti (FI)

( * ) Notice: Subject to any disclaimer, the term of this patent is extended or adjusted under 35 U.S.C. 154(b) by 136 days.

(21) Appl. No.: 14/418,066

(22) PCT Filed: Jul. 29, 2013

(86) PCT No.: PCT/FI2013/050777
§ 371 (c)(1),
(2) Date: Jan. 28, 2015

(87) PCT Pub. No.: WO2014/020236
PCT Pub. Date: Feb. 6, 2014

(65) Prior Publication Data
US 2015/0260053 A1    Sep. 17, 2015

(30) Foreign Application Priority Data

Jul. 30, 2012    (FI) ...................................... 20125821

(51) Int. Cl.
*F01D 15/10*    (2006.01)
*F02C 3/13*    (2006.01)
(Continued)

(52) U.S. Cl.
CPC .............. *F01D 15/10* (2013.01); *F01K 21/04* (2013.01); *F02C 3/13* (2013.01); *F02C 3/14* (2013.01);
(Continued)

(58) Field of Classification Search
CPC ...... F02C 3/32; F02C 3/30; F02C 5/02; F02C 5/12; F02C 5/00; F01K 7/06; F23R 7/00
See application file for complete search history.

(56) References Cited

U.S. PATENT DOCUMENTS 2,095,984 A    10/1937   Holzwarth
3,167,913 A *  2/1965   Muhlberg ................ F02C 3/20
                                                        60/39.53
(Continued)

FOREIGN PATENT DOCUMENTS

CN    101566102 A    10/2009
CN    101592082 A    12/2009
(Continued)

OTHER PUBLICATIONS

Extended European Search Report prepared by the European Patent Office for EP13825645; dated Mar. 16, 2016, 6 pages.
(Continued)

*Primary Examiner* — Pascal M Bui Pho
*Assistant Examiner* — Stefan Ibroni
(74) *Attorney, Agent, or Firm* — Chernoff Vilhauer LLP

(57) ABSTRACT

An object of the present invention is to provide a method and a system for implementing the method so as to alleviate the disadvantages of a reciprocating combustion engine and gas turbine in electric energy production. The invention is based on the idea of arranging a combustion chamber (10) outside a gas turbine (22) and providing compressed air to the combustion chamber (10) in order to carry out a combustion process in controlled and optimal conditions.

9 Claims, 5 Drawing Sheets

(51) Int. Cl.
*F02C 3/14* (2006.01)
*F02C 6/16* (2006.01)
*F01K 21/04* (2006.01)
*F02C 5/12* (2006.01)

(52) U.S. Cl.
CPC .................. *F02C 5/12* (2013.01); *F02C 6/16* (2013.01); *F05D 2260/601* (2013.01); *Y02E 20/16* (2013.01); *Y02E 60/15* (2013.01)

(56) References Cited

U.S. PATENT DOCUMENTS

| | | | | |
|---|---|---|---|---|
| 3,831,373 A | * | 8/1974 | Flynt | F02C 6/16 290/52 |
| 3,975,900 A | * | 8/1976 | Pfefferle | F23R 3/26 60/39.23 |
| 6,003,298 A | * | 12/1999 | Horner | F01D 17/145 60/39.182 |
| 6,062,018 A | * | 5/2000 | Bussing | B01J 3/08 60/39.181 |
| 6,101,806 A | | 8/2000 | Chen et al. | |
| 6,311,471 B1 | * | 11/2001 | Waldherr | F02C 3/30 60/39.55 |
| 6,651,433 B1 | * | 11/2003 | George, Jr. | B63G 8/12 60/614 |
| 2005/0172635 A1 | | 8/2005 | Carlson et al. | |
| 2009/0138170 A1 | | 5/2009 | Nem et al. | |
| 2010/0089056 A1 | | 4/2010 | Cooper et al. | |

FOREIGN PATENT DOCUMENTS

| | | | | |
|---|---|---|---|---|
| GB | 530311 A | * | 12/1940 | ........ F02C 5/00 |
| GB | 688492 | | 3/1953 | |
| GB | 2462245 A | | 2/2010 | |
| JP | 2005207359 A | | 8/2005 | |

OTHER PUBLICATIONS

Written Opinion from corresponding PCT application No. PCT/FI2013/050777, dated Nov. 28, 2013, 6 pgs.
Search report from Finnish Application No. 20125821, dated Apr. 4, 2014, 2 pgs.

* cited by examiner

SYSTEM AND METHOD FOR GENERATING ELECTRIC ENERGY

CROSS-REFERENCE TO RELATED APPLICATIONS

This is a national stage application filed under 35 USC 371 based on International Application No. PCT/FI2013/050777 filed Jul. 29, 2013 and claims priority under 35 USC 119 of Finnish Patent Application No. 20125821 filed Jul. 30, 2012.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method of generating electricity and to electric generator system.

BACKGROUND OF THE INVENTION

A typical electric generator system of the prior art consists of a combustion engine, a fuel tank and a generator The combustion engine comprises a set of cylinders with a corresponding set of reciprocating pistons. One of the problems associated with the above arrangement is that the moving pistons and other moving parts have to be constantly lubricated with oil which has a significant impact on running temperature of the combustion engine. Consecutively, the running temperature is a significant factor when considering the coefficient of efficiency. The above mentioned engine withstands running temperature of less than 100 degrees Celsius without a significant deterioration of durability. The temperature is too low for vaporizing water and therefore it cannot be efficiently used for generating electricity i.e. it is just waste heat.

U.S. Pat. No. 2,095,984 (H. Holzwarth) discloses an explosion turbine plant. The explosion turbine plant comprises an impulse rotor, pistonless explosion chambers for generating explosion gases and nozzles for expanding and directing the gases to a rotor being driven exclusively by intermittent puffs of said gases.

Another typical generator system of the prior art consists of a gas turbine and a generator driven by a shaft of the gas turbine. The problem with gas turbines is that the combustor is in relatively low pressure because the gas turbine's combustor is practically an open space. The low pressure of the combustor significantly drops the coefficient of efficiency. In Holzwarth turbine plant the intermittent low pressure significantly drops the coefficient of efficiency.

BRIEF SUMMARY OF THE INVENTION

An object of the present invention is thus to provide a method and a system for implementing the method so as to alleviate the above disadvantages.

The invention is based on the idea of arranging a combustion chamber outside a gas turbine and providing compressed air to the combustion chamber in order to carry out a combustion process in controlled and optimal conditions.

An advantage of the method and system of the invention is that the conditions in the combustion chamber may be optimized for the combustion process which significantly increases overall efficiency of the system. The combustion chamber may have running temperature of hundreds of degrees Celsius and the pressure inside the compression chamber may be similar to the pressure in the end of compression stroke in a diesel cycle of a reciprocating combustion engines. Such a temperature increases the efficiency of the combustion process and the heat may be easily converted to electricity due to the high temperature.

BRIEF DESCRIPTION OF THE SEVERAL VIEWS OF THE DRAWINGS

In the following the invention will be described in greater detail by means of preferred embodiments with reference to the attached drawings, in which.

DETAILED DESCRIPTION OF THE INVENTION

Figure 1:
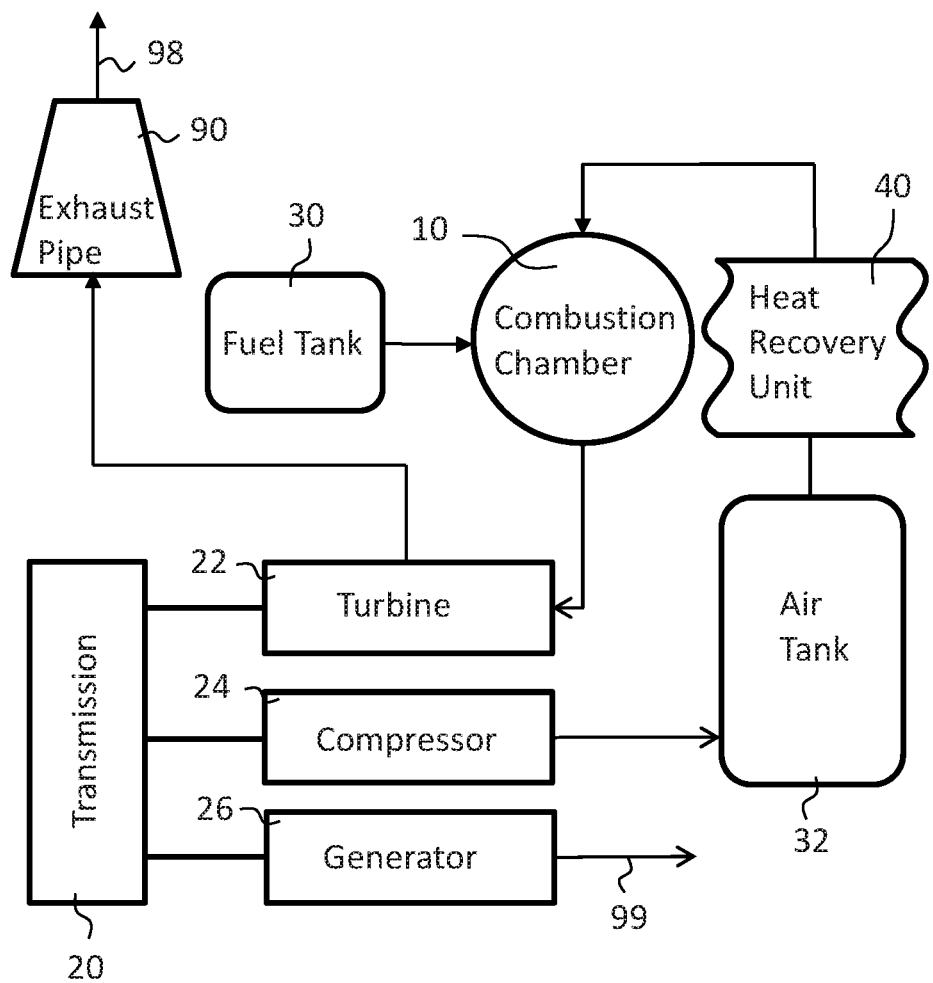
FIG. 1 illustrates a first electric generator system according to an embodiment of the invention.

Referring to FIG. 1, the electric generator system comprises a turbine 22 which is connection with a generator 26 and a compressor 24 axially or via a transmission 20. The generator may also be axially connected to the turbine 22. A rotor of the turbine 22 rotates when energy is fed to the turbine by means of fluid flowing through the turbine. Rotation of the turbine rotor drives the transmission 20 and the generator 26 and the compressor 24 which both are connected to the transmission. The turbine, the generator and the compressor may be connected to the transmission by means of drive shafts, axles or other suitable power transmission means. The arrangement converts the energy fed to the turbine 22 into electric energy output 99 with the generator 26 and into air pressure with the compressor 24 which compresses air for the combustion chamber 10. In an embodiment the compressor 24 accumulates compressed air into an air tank 32 which then feeds the combustion chamber 10 with the compressed air accumulated in the air tank 32. The compressor 24 is preferably a screw compressor which is highly efficient and able to provide high pressure to the combustion chamber 10 and to the air tank 32. In an embodiment, the system comprises a second screw compressor connected in series with the first screw compressor 24 to provide even higher pressure to the air tank. In an embodiment, the system comprises a combination of an axial compressor 24, such as a radial compressor and a screw compressor connected in series with the axial compressor 24 to provide air to the air tank. The compressor or the compressors are preferably arranged to build up pressure of over 20 bars to the air tank. In an embodiment, the compressor or the compressors are arranged to build up pressure of over 30 bars, 35 bars or 40 bars to the air tank. In an embodiment the compressor 24 may be driven with an electric motor. In an embodiment an intercooler can be provided between the series-connected first compressor and the second compressor to cool down the air between the compressors. The intercooler can then be used to generate steam and/or to heat air before feeding those to the combustion chamber.

The electric generator system also comprises a combustion chamber 10 which is arranged to receive compressed air from the compressor 24 or from the air tank 32 and fuel from a fuel tank 30 to initiate a combustion process. The compressed air is released from the air tank into the combustion chamber 10 by means of a controllable valve. The compressed air is preheated before entering the combustion chamber with a heat recovery unit 40 which conveys heat from the combustion chamber to the compressed air. The compressed air may also be preheated with other means, for example electrically with a resistor, when the system is started and the combustion chamber is at room temperature. Fuel is released or pumped from the fuel tank and injected into the combustion chamber. The fuel is preferably diesel or liquid natural gas (LNG). In an embodiment, the fuel is gasoline, natural gas, ethanol, biodiesel or a mixture of two or more the preceding fuels. In an embodiment, the fuel comprises hydrogen and carbon monoxide mixture which is a by-product of a soda recovery unit. In an embodiment water or steam may be injected with fuel into the combustion chamber.

The fuel injected into the combustion chamber ignites due to high pressure and temperature inside the combustion chamber. The high pressure in the combustion chamber is arranged by releasing air from the air tank to the combustion chamber. In addition to the preheating, the heat of the combustion chamber heats up the released air inside the combustion chamber and builds up even higher pressure. The ignition may be triggered with an ignition coil, a glow plug, a pre-glow arrangement or a heater arrangement when the system is started and the combustion chamber has not yet reached its running temperature. The combustion process produces heat which heats up the combustion chamber and keeps the combustion process running by heating the fuel and the compressed air which are introduced into the combustion chamber. In an embodiment the ignition is also used during the combustion cycle after the system is started.

The combustion chamber 10 is preferably a hollow container with input means for fuel and compressed air and an output for combustion products i.e. exhaust gas. The inputs and the output are controllable and may be closed and opened in specific phases of a combustion cycle in order to build up pressure into the combustion chamber before the ignition of the fuel and to expel combustion products after the ignition. The combustion process in the combustion chamber is a cycle process which at least resembles Diesel cycle. Preheated compressed air from the air tank is introduced into the combustion chamber and fuel is injected into the combustion chamber until the air-fuel mixture ignites. The combustion of the air-fuel mixture expands its volume so the combustion products and the compressed air are expelled through the output when output valve is opened. Running speed of the combustion cycle is controlled by controlling the input and output valves. The running speed may be chosen freely within certain limits which are defined by the properties of the system. Such properties that may limit the running speed may be for example operation speed of the valves, the air pressure in the air tank, fuel type, etc. However, the running speed may be adjusted for optimal performance in each system because it is not restricted by moving pistons or similar physical limitations of moving mass.

The combustion chamber has preferably a simple form, most preferably a sphere or a cylinder, for enabling a quick, clean and complete combustion process. The simple form enables higher running temperatures which increases efficiency and decreases the amount of harmful particles and gases produced during the combustion process. The combustion chamber is arranged to function in high temperatures. In addition to the simple form, also the material of the combustion chamber has to withstand high temperatures without significant deterioration of performance or durability. The material of the combustion chamber may be ceramic, metal, alloy or preferably a combination of two or more materials. For example, the combustion chamber may comprise an alloy encasing with a ceramic inner coating. The alloy encasing withstands high pressure and strong forces while the ceramic inner coating withstands high surface temperatures. The construction of the combustion chamber is preferably arranged to withstand running temperature of 400 degrees of Celsius. In an embodiment the combustion chamber is arranged to withstand running temperature of 500, 600, 700 or 800 degrees of Celsius. The combustion chamber itself does not comprise any moving parts so it is relatively simple task to design the combustion chamber to withstand high temperatures. The moving parts that experience the highest thermal stress are the valves at the input and output ports of the combustion chamber. However, there are valves readily available that are designed to operate in these temperatures and therefore it should be relatively easy task to design and realize a durable valve system.

The output of the combustion chamber 10 leads a stream consisting of the combustion products and the compressed air from the combustion chamber into the turbine 22. Due to the high pressure in the combustion chamber, the stream is expelled with high velocity when the output is opened. The expelling of the combustion products may be enhanced by having the output and the air input open simultaneously for a certain period of time. The turbine 22 comprises a rotor which rotates when the stream flows through the turbine. The rotating rotor drives the transmission 20 which in turn drives the generator 26 and the compressor 24 as stated earlier. The stream is guided to exhaust pipe 90 after the turbine and the exhaust gas 98 is released from the system.

The combustion chamber 10 is preferably a separate unit outside the turbine 22. The combustion products expelled from the combustion chamber 10 are guided to the turbine 22 with a pipe, tube or some other channel connecting the combustion chamber 10 and the turbine 22. In an embodiment the system comprises multiple combustion chambers. In that case each combustion chamber has a pipe, tube or some other channel connecting that combustion chamber to the turbine 22. Preferably the multiple combustion chambers are arranged to expel their combustion products sequentially, i.e. not all at the same time, to provide a steadier flow of combustion products to the turbine 22.

Figure 2:
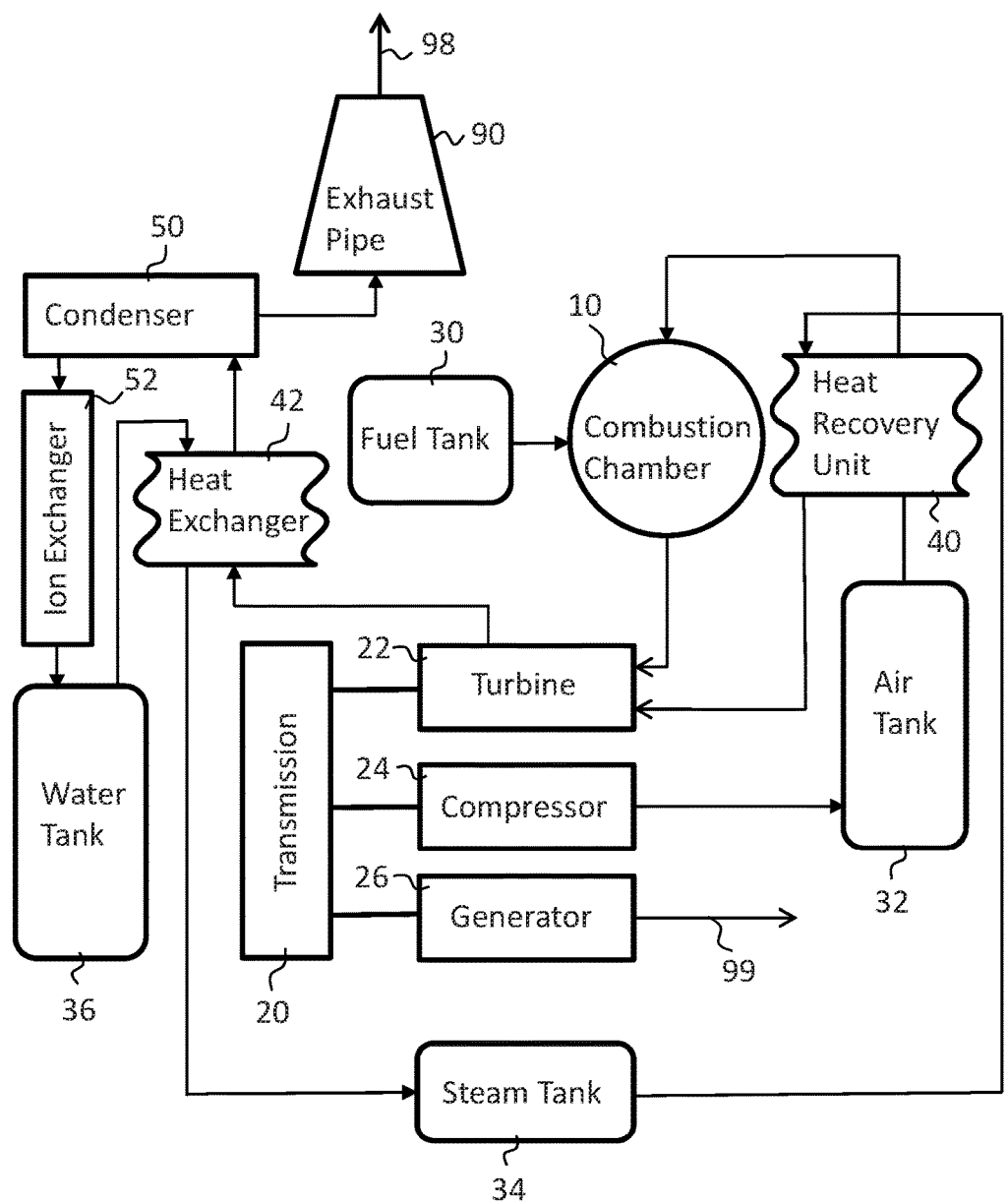
FIG. 2 illustrates a second electric generator system with steam circulation system according to an embodiment of the invention.

Now referring to FIG. 2, in an embodiment the electric generator system further comprises a steam circulation system. The steam circulation system comprises a steam tank 34, a heat recovery unit 40, a heat exchanger 42, a condenser 50 and a water tank 36. In an embodiment, the steam circulation system further comprises a second turbine. Water and steam circulates in the steam circulation system wherein the water is accumulated into the water tank 36 and the steam is accumulated into the steam tank 34. In an embodiment the steam tank and the water tank is a single tank wherein the water is accumulated in the bottom of the tank and steam is accumulated on the top of the tank. The flowing of the steam is based on pressure differences within the system but it might be assisted with pumps or similar arrangement if necessary. The flowing is controlled by means of a number of valves which may be operated in controlled manner.

The steam is arranged to flow from the steam tank 34 to the heat recovery unit 40. The heat recovery unit 40 is in thermal connection with the combustion chamber 10 so that the combustion chamber heats up the heat recovery unit in which the heat is conveyed to the steam flowing through the heat recovery unit. The heat recovery unit may be a separate unit having a thermal connection to the combustion chamber or it may be a fixed part of the combustion chamber. In an embodiment the heat recovery unit may even a pipework inside the combustion chamber or tubing on the surface of the combustion chamber. When the heat from the combustion chamber is conveyed to the steam flowing through the heat recovery unit, the steam rapidly heats up and expands. The steam flow is then directed to the turbine 22 wherein the steam flow rotates the rotor of the turbine 22 simultaneously with the combustion products and compressed air which are expelled from the combustion chamber 10 into the turbine 22.

In an embodiment, the steam is not directed into the same turbine 22 as the combustion products. In that embodiment the system comprises a second turbine which is dedicated to the steam stream while the (first) turbine 22 is dedicated to the stream of combustion products and compressed air. The stream of combustion products and compressed air may even be arranged to flow through an additional heat exchanger after the turbine 22 to heat up the steam stream before that stream enters the second turbine. The arrangement of the second turbine may be similar to known combined cycle power plants.

From the turbine a stream of steam, compressed air and combustion products flows through the heat exchanger 42 to the condenser 50 wherein the steam is condensed into water and the compressed air and the combustion products are guided out of the system through exhaust pipe 90. In the embodiment of the second turbine the stream of combustion products and compressed air is arranged to flow through heat exchanger 42 directly to exhaust pipe and the steam stream is arranged to flow through the heat exchanger 42 and the condenser 50 to the water tank 36.

The water condensed from the steam flows into the water tank 36 or is pumped in there. An ion exchanger 52 may be arranged between the condenser 50 and the water tank 36 for purifying the water before it enters the cycle again. The water tank 36 accumulates water which is then guided or pumped to the heat exchanger 42. The heat exchanger conveys the heat from the stream of steam, compressed air and combustion products to the water flowing through the heat exchanger. The heat of the heat exchanger vaporizes the water into steam which is then guided to flow back into the steam tank 34.

Figure 3:
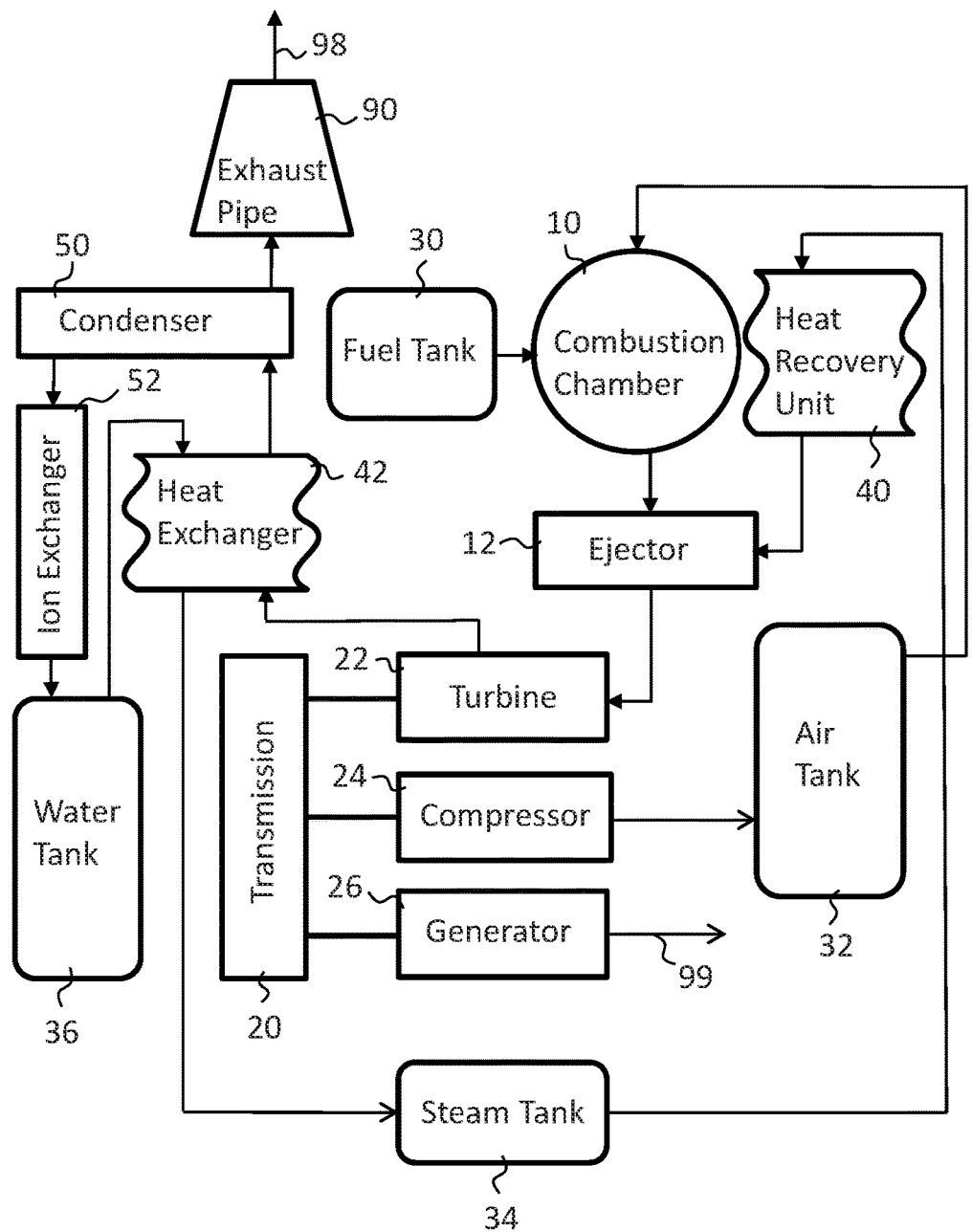
FIG. 3 illustrates a third electric generator system with an injector or ejector system according to an embodiment of the invention.

FIG. 3 illustrates an electric generator system which is otherwise similar to the system of FIG. 2 except that the system further comprises a pump having a converging-diverging nozzle, for example an injector or ejector 12 for combining the stream of combustion products from the combustion chamber 10 and the steam from the heat recovery unit 40. The pump having a converging-diverging nozzle is called an ejector within the description but in an embodiment the pump can also be for example an injector, steam injector or steam ejector. The ejector 12 is between the turbine and the combustion chamber and its heat recovery unit. The combustion products and the compressed air are expelled into the ejector wherein the steam from the heat recovery unit is superheated by the hot matter from the combustion chamber. The superheating of the steam causes rapid expansion of the steam. The ejector 12 guides the stream of superheated steam, combustion products and compressed air into the turbine 22 wherein the stream rotates the rotor of the turbine.

In an embodiment the system also comprises an adjustable nozzle and a valve in connection with the ejector 12 and the output of the combustion chamber 10 for adjusting the expelling of combustion products from the combustion chamber 10. The nozzle has a certain design and a form which may be altered. The nozzle is within the ejector in a by-pass flow of the steam flowing from the heat recovery unit 40 to the turbine 22. The form of the nozzle has a significant impact to the expelling of the combustion products from the combustion chamber when the valve in the output is open. By altering the form of the nozzle the expelling of the combustion products may be increased with help of the by-pass flow of the steam.

Figure 4:
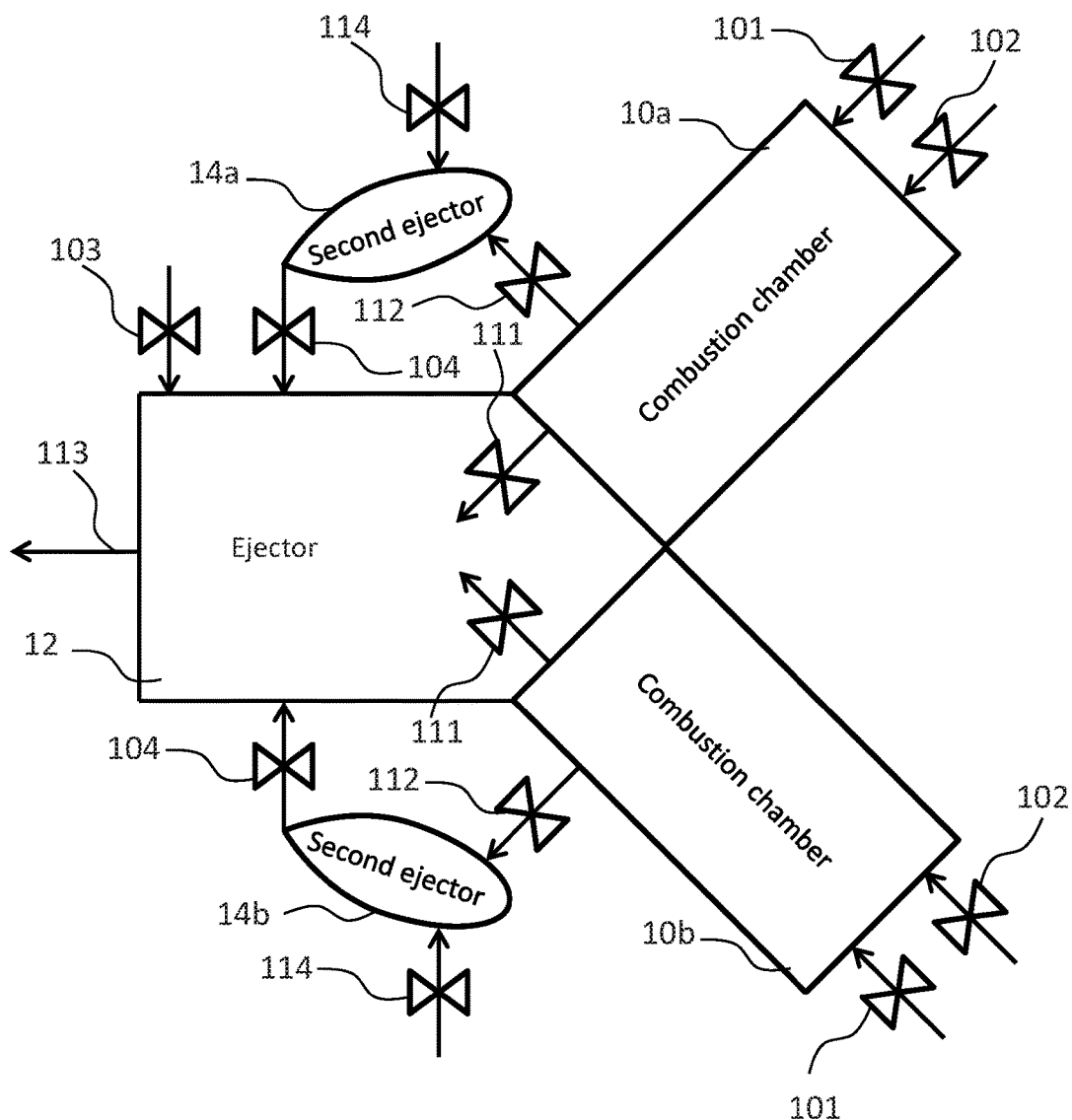
FIG. 4 illustrates a detail of a system having two combustion chambers.

FIG. 4 illustrates a detail of an embodiment of an electric combustion system having two combustion chambers 10a and 10b and an ejector 12. The number of combustion chambers and ejectors is not limited to this example. Two combustion chambers and one ejector were chosen for this embodiment to give an example and represent the capabilities of the system. In an embodiment the electric combustion system has one, two, three, four or more combustion chambers and one, two, three, four or more ejectors.

Each combustion chamber 10a, 10b comprises one or more inputs 101, 102 controlled with input valves and one or more outputs 111, 112 controlled with output valves. In an embodiment each combustion chamber comprises an output controlled by a main exhaust valve 111. In an embodiment each combustion chamber comprises two outputs, one output being controlled by a main exhaust valve 111 and one output being controlled by an auxiliary exhaust valve 112. In an embodiment each combustion chamber comprises an input 101 for fuel. In an embodiment each combustion chamber comprises inputs 101, 102 for fuel and pressurized air. In an embodiment each combustion chamber comprises inputs for fuel, pressurized air and steam. In an embodiment each combustion chamber comprises inputs for one or more of the following: fuel, pressurized air, steam and water. The steam may be produced at least partially using waste heat of the combustion process of the system.

A combustion cycle in the system of FIG. 4 could have the following steps. First pressurized air is fed to the combustion chambers 10a, 10b via air inputs 102 and fuel is fed to the combustion chambers 10a, 10b via fuel inputs 101. The pressure in the combustion chambers is built up due to residue heat until the fuel in the combustion chambers ignites, for example at 20 to 30 bar pressure, and produces combustion products and more pressure. The combustion products and the pressure are released to the ejector 12 by opening the main exhaust valve 111 between a combustion chamber 10*a* and the ejector 12. Preferably the combustion cycles in each combustion chamber runs with a phase difference to the other combustion chambers so that only one main exhaust valve 111 at a time is open. The combustion products flow from the combustion chamber to the ejector 12 and from ejector to turbine 22 through an output 113. At the same time, liquid water and or water vapour can be injected to the combustion chamber 10*a* via inputs and thus improving the ventilation of the combustion products out of the combustion chamber. The injection of water and/or vapour also helps to keep the pressure in an elevated level for an extended period of time. The injection of water and/or vapour also lowers the temperature of the main exhaust valve 111 which can extend the lifetime of the main exhaust valve 111. When the pressure in the combustion chamber and in the ejector has dropped, for example to 40 to 50 bars, the main exhaust valve 111 is closed. One or more of the valves may be electronically controlled for example via a control unit.

After closing the main exhaust valve 111 the ejector can be sprayed with liquid water and/or water vapour i.e. steam via valve 103 which raise the pressure in the ejector 12, for example to 65 bars. At a certain pressure in the ejector 12, for example 65 bars, the main exhaust valve 111 of the second combustion chamber 10*b* opens and releases combustion products to the ejector 12 and from there to the turbine 22. At the same time the secondary exhaust valve 112 of the first combustion chamber 10*a* is kept open to ventilate the residue combustion products from the first combustion chamber 10*a*. The ventilation can be enhanced by introducing pressurized air or steam via the inputs 101, 102 to the combustion chamber. The secondary exhaust valve 112 may lead the residue combustion products to the turbine 22 via one or more second ejectors 14*a*, 14*b*. In an embodiment a single second ejector can comprise multiple inputs so that it can be used with two combustion chambers. Once the first combustion chamber 10*a* is ventilated and the pressure has dropped to a sufficiently low level, for example to 20, 10, 5 or 2 bars, the secondary exhaust valve 112 is closed and the next cycle of the combustion cycle can begin.

In an embodiment the second ejector 14*a*, 14*b* is arranged to receive motive steam or motive gas via input 114. The motive gas is preferably pressurized water vapour for example in 60, 80 or 100 bar pressure. The motive gas is directed through the second ejector 14*a*, 14*b* and discharged to the ejector 12 via valve 104. When the motive gas goes through the second ejector it creates a suction effect drawing residue combustion products from a combustion chamber 10*a*, 10*b* when output valve 112 connecting the combustion chamber to the second ejector is open. The valve 104 is preferably a control valve. The throughput and/or opening direction of the valve 104 can be adjusted. In an embodiment all excess steam produced within the system can be fed to the turbine via the valve 104 and/or the second ejector 14*a*, 14*b*.

In an embodiment a back flow from the turbine 22 using an intermediate steam tapping can be introduced to a third ejector. The back flow or the intermediate steam from the turbine may comprise steam or combustion products or a mixture of steam and combustion products which are introduce to the third ejector. The pressure of the intermediate steam at the third ejector is raised to a sufficient level by using valves and introducing gas such as water vapour to the third ejector. The steam and the combustion products increase the volume of the gas and decrease the temperature of the gas. The mixture of gases is introduced from the third ejector to the ejector 12 for example via the second ejector 14*a*, 14*b* and valve 104, or to some other input valve of the system.

Figure 5:
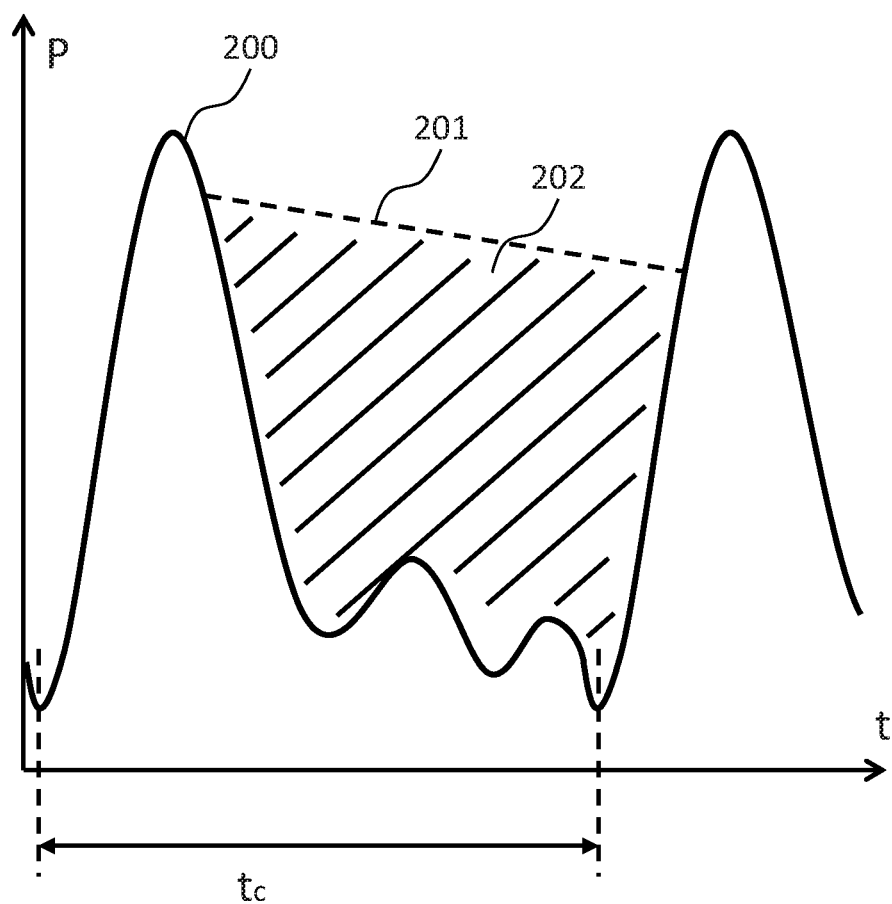
FIG. 5 illustrates the changes in pressure over time in a system according to an embodiment.

FIG. 5 illustrates time dependence of pressure in a system according to an embodiment. As the combustion cycle causes the pressure to change within the system in rather broad range, the turbine 22 does not receive optimal input unless the system in controlled in a time-dependent manner. Preferably all the inputs 101, 102, 103, 104 are controlled in time-dependent manner to keep the output 113 to the turbine in optimal pressure. Without any other time-dependent inputs than fuel and air, the output to the turbine would look like the curve 200 in FIG. 5. In the beginning of the combustion cycle the pressure builds up quickly peaking just before the main exhaust valve 111 is opened which quickly lowers the pressure as the combustion products flow through the turbine. Now if the combustion chamber is injected with liquid water and/or water vapour immediately after the main exhaust valve 111 is opened, the pressure would not fall as quickly because the liquid water would evaporate and the vapour would heat up due to residue heat of the combustion chamber and thus the injection would lessen the impact of opening the main exhaust valve 111. In a similar manner, once the main exhaust valve 111 has been closed, the ejector can be sprayed with liquid water and/or water vapour i.e. steam via valve 103 which raise the pressure in the ejector 12 thus raising the output pressure to the turbine. The amount of liquid water, steam and air is controlled in a time-dependent manner in order to prevent the output to the turbine from dropping too much. Keeping the output to the turbine in an elevated and relatively constant level has a significant impact on the efficiency of the system. The turbine can be driven in optimal operating range most of the time with a relatively constant output whereas the turbine can not make the most out of short bursts.

The output to the turbine can be maintained in an elevated level with the injection of water, steam and air. This elevated level is illustrated with dashed line 201 in FIG. 5. The area 202 between the solid line 200 and the dashed line 201 during a cycle t, represents the amount of injected water, steam and air which keep the output in an elevated level until a main exhaust valve is opened. In an embodiment the pressure within the ejector 12 is kept always over for example 20, 30, 40 or 50 bars. In an embodiment the amount of injected water, steam and air and point of time at which those are injected are determined based on measured quantities of the system. Such measured quantities can be for example temperature, pressure, humidity, gas composition, state of a valve or some other process quantity. Said quantities can be measured with e.g. sensors. In an embodiment the amount of injected water, steam and air and point of time at which those are injected are determined based on the phase of the combustion cycle. The time dependent injection of water, steam also increase the reliability of the turbine 22 by controlling the temperature of the gas which is introduced to the turbine 22. The injection of water and steam lowers the average temperature of the gas introduced to the turbine and therefore it allows for higher pressure (and thus higher temperature) to be used in the combustion chamber.

It will be obvious to a person skilled in the art that, as the technology advances, the inventive concept can be implemented in various ways. The invention and its embodiments are not limited to the examples described above but may vary within the scope of the claims.

SEQUENCE LISTING

Not Applicable.

The invention claimed is:

1. An electric generator system comprising:
a turbine in connection with a generator and a compressor for converting energy fed to the turbine into electric energy with the generator and for using the energy fed to the turbine to compress air with the compressor,
a pistonless combustion chamber arranged to receive compressed air via a first input valve from the compressor and fuel via a second input valve from a fuel tank to initiate a combustion process, a stream of combustion products created in the pistonless combustion chamber being expelled via an output valve,
a control system for controlling the first and second input valves and the output valve in a time-dependent manner for running an intermittent combustion process cycle comprising a compression phase and an expansion phase in the pistonless combustion chamber, the first and second input valves being open and the output valve being closed during the compression phase;
a heat recovery unit being connected thermally to the combustion chamber so that the pistonless combustion chamber heats up the heat recovery unit in which heat is conveyed to steam flowing through the heat recovery unit,
an ejector receiving as a first input the steam from the heat recovery unit and as a second input the stream of combustion products from the combustion chamber, whereby the steam from the heat recovery unit is superheated by the stream of combustion products in the ejector causing rapid expansion of the steam creating a mixture of superheated steam and combustion products, and wherein the mixture of superheated steam and combustion products is directed from the ejector to the turbine in order to rotate a rotor of the turbine.

2. An electric generator system as claimed in claim 1, characterized in that the system further comprises: a steam tank for accumulating the steam, a heat exchanger for capturing thermal energy of the steam, a condenser for condensing the steam into water, a water tank for accumulating the water, and a pump for pumping the water from the water tank to the heat exchanger for vaporizing the water into the steam which is arranged to flow into the steam tank.

3. An electric generator system as claimed in claim 1, characterized in that the compressor is a first screw compressor and the system further comprises a second screw compressor connected in series with the first screw compressor.

4. An electric generator system as claimed in claim 1, characterized in that the system further comprises an air tank for accumulating the compressed air from the compressor and for providing the compressed aft to the combustion chamber.

5. An electric generator system as claimed in claim 1, characterized in that the heat recovery unit is also used for preheating the compressed air prior to being introduced into the pistonless combustion chamber.

6. An electric generator system as claimed in claim 1, characterized in that the heat recovery unit is also used for preheating the compressed air prior to being introduced into the combustion chamber.

7. A method for generating electric energy comprising:
providing compressed air with a compressor using power of a turbine and directing the compressed air via a first input valve to a pistonless combustion chamber,
providing fuel via a second input valve to the pistonless combustion chamber, expelling a stream of combustion products via an output valve from the pistonless combustion chamber, controlling the first and second input valves and the output valve with a control system in a time-dependent manner for running an intermittent combustion process cycle comprising a compression phase and an expansion phase in the combustion chamber, the first and second input valves being open and the output valve being closed during the compression phase,
generating electric power with a generator using the power of the turbine,
providing steam or water to a heat recovery unit being connected thermally to the pistonless combustion chamber so that the combustion pistonless chamber heats up the heat recovery unit in which heat is conveyed to the steam flowing through the heat recovery unit creating heated steam,
directing the heated steam from the heat recovery unit as a first input to an ejector, directing the stream of combustion products from an output of the combustion chamber as a second input to the ejector, whereby the steam from the heat recovery unit is superheated by the stream of combustion products in the ejector creating a mixture of superheated steam and combustion products, and wherein the mixture of superheated steam and combustion products is directed from the ejector to the turbine in order to rotate a rotor of the turbine.

8. A method as claimed in claim 7, characterized in that said controlling of said first and second input valves is time-dependent.

9. A method as claimed in claim 7, characterized in that said controlling of said output valve is time-dependent.

* * * * *

UNITED STATES PATENT AND TRADEMARK OFFICE
CERTIFICATE OF CORRECTION

| | |
|---|---|
| PATENT NO. | : 9,885,248 B2 |
| APPLICATION NO. | : 14/418066 |
| DATED | : February 6, 2018 |
| INVENTOR(S) | : Timo Erämaa |

Page 1 of 2

It is certified that error appears in the above-identified patent and that said Letters Patent is hereby corrected as shown below:

Column 2, Line 50     "...a turbine 22 which is connection with a generator.." should be --...a turbine 22 which is connected with a generator...--

Column 4, Line 38     "...so it is relatively simple task to design..." should be --...so it is a relatively simple task to design...--

Column 4, Line 43     "...and therefore it should be relatively easy task..." should be --...and therefore it should be a relatively easy task...--

Column 7, Line 26     "...via valve 103 which raise the pressure in the ejector..." should be --...via valve 103 which raises the pressure in the ejector.--

Column 7, Line 64     "...which are introduce to the third ejector." should be --...which are introduced to the third ejector.--

Column 8, Line 11     "...unless the system in controlled in a time-dependent..." should be --...unless the system is controlled in a time-dependent...--

Column 8, Line 43     "...during a cycle t, represents..." should be --...during a cycle $t_c$, represents...--

Column 10, Line 6 (Claim 5) "An electric generator system as claimed in claim 1, characterized in that the heat recovery unit is also used for preheating the compressed air prior to being introduced into the pistonless combustion chamber." should be --An electric generator system as claimed in claim 1, characterized in that the fuel used in the system is one of the following group: diesel, gasoline, ethanol, natural gas, liquid natural gas and mixture of hydrogen and carbon monoxide.--

Signed and Sealed this
Tenth Day of April, 2018

Andrei Iancu
*Director of the United States Patent and Trademark Office*

CERTIFICATE OF CORRECTION (continued)
U.S. Pat. No. 9,885,248 B2

Column 10, Line 9 (Claim 6) "An electric generator system as claimed in claim 1, characterized in that the heat recovery unit is also used for preheating the compressed air prior to being introduced into the combustion chamber."
should be --An electric generator system as claimed in claim 1, characterized in that the heat recovery unit is also used for preheating the compressed air prior to being introduced into the pistonless combustion chamber.--